United States Patent

Yamashita et al.

[11] Patent Number: 5,484,880
[45] Date of Patent: Jan. 16, 1996

[54] POLYIMIDE

[75] Inventors: Wataru Yamashita; Yuichi Okawa; Shoji Tamai; Mitsunori Matsuo; Tsutomu Ishida, all of Kanagawa; Keizaburo Yamaguchi, Chiba; Akihiro Yamaguchi, Kanagawa, all of Japan

[73] Assignee: Mitsui Toatsu Chemicals, Inc., Tokyo, Japan

[21] Appl. No.: 354,806

[22] Filed: Dec. 13, 1994

[30] Foreign Application Priority Data

Dec. 21, 1993 [JP] Japan .................................. 5-321986
Mar. 7, 1994 [JP] Japan .................................. 6-035524

[51] Int. Cl.$^6$ .......................... C08G 77/10; C08G 69/26; C07C 225/22
[52] U.S. Cl. .......................... 528/353; 528/170; 528/171; 528/172; 528/173; 528/174; 528/220; 528/224; 528/229; 564/328; 564/329
[58] Field of Search .......................... 528/353, 170, 528/171, 172, 173, 174, 220, 224, 229; 564/328, 329

[56] References Cited

U.S. PATENT DOCUMENTS 3,847,867  11/1974  Heath et al. .................. 528/26
3,847,869  11/1974  Williams ...................... 528/170

FOREIGN PATENT DOCUMENTS 62-205124  9/1987  Japan .
1-110530   4/1989  Japan .
1-123830   5/1989  Japan .
3-47837    2/1991  Japan .

Primary Examiner—Shelley A. Dodson
Attorney, Agent, or Firm—Burns, Doane, Swecker & Mathis

[57] ABSTRACT

The present invention relates to an amorphous polyimide or a polyimide copolymer having a requisite structural unit consisting of one or more recurring structural units represented by the formula (1):

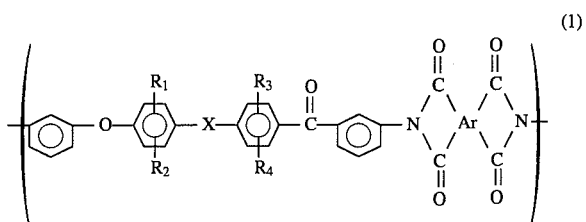

wherein X is a direct bond, oxygen atom or sulfur atom, and $R_1$, $R_2$, $R_3$ and $R_4$ are individually a hydrogen atom or methyl, and Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

Polyimide and the polyimide copolymer of the invention has excellent heat resistance, is outstanding in melt-flow stability, has greatly improved processability, and can be applied to structural materials, and electric- electronic appliances.

16 Claims, 2 Drawing Sheets

POLYIMIDE

BACKGROUND OF THE INVENTION

1. Field of the Invention

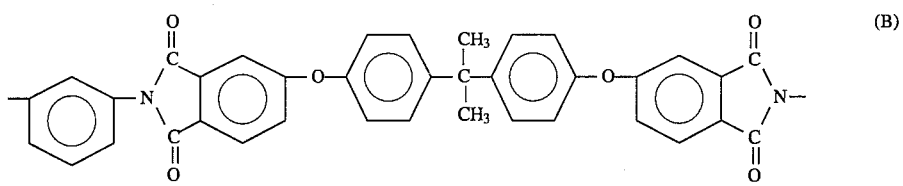

The present invention relates to a novel polyimide, and more particularly to a novel, thermoplastic and amorphous polyimide, a preparation process thereof, and a novel aromatic diamino compound used for preparing said polyimide and a preparation process of the diamino compound.

The invention further relates to a polyimide-based resin composition comprising the polyimide and a fibrous reinforcement.

The aromatic diamino compound of the invention is useful as a raw material of polyimide of the invention and can also be applied to the raw material of polyamide, polyamideimide, bismaleimide and epoxy resin.

2. Related Art of the Invention

Polyimide is excellent in mechanical properties, chemical resistance, flame retardance and electrical properties in addition to its essentially excellent heat resistance, and thus conventionally has broad use in the field of forming materials, composite materials and electric- electronic appliances.

For example, a representative polyimide which has been known is Kapton and Vespel (Trade Mark of E. I. Du Pont de Nemours & Co.) which have recurring structural units of the formula (A):

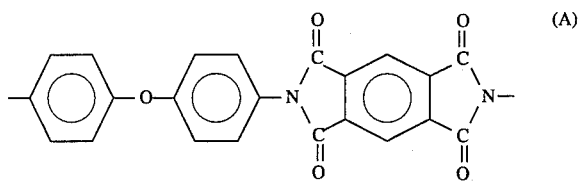

The polyimide, however, is insoluble and infusible and thus must be formed by using a specific technique such as sinter molding by way of polyamic acid precursor. Such a difficulty results in problem in the processing step and it is thus difficult to obtain articles of a complex shape. Consequently, finishing operation such as cutting is additionally required in order to obtain satisfactory articles and causes a serious defect of high processing cost.

Another type of polyimide which has been known as amorphous and thermoplastic polyimide having an improved processability is Ultem (Trade Mark of General Electric Co.) which has recurring structural units of the formula (B).

(U.S. Pat. Nos. 3,847,867 and 3,847,869)

The polyimide, however, has a glass transition temperature (hereinafter referred to as Tg) of 215° C. and thus heat resistance is unsatisfactory.

The present inventors have found that polyimide having recurring structural units of the formula (C):

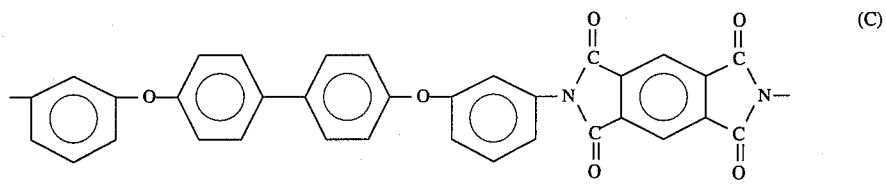

is thermoplastic while maintaining heat resistance, solvent resistance and mechanical properties which are essential properties of polyimide (Japanese Laid-Open Patent SHO 62-205124, and HEI 1-110530 and 1-23830).

The polyimide, however, is essentially crystalline and causes crystallization by specific treatment.

Further, the present inventors have introduced recurring structural units obtained by using a compound of the formula (D):

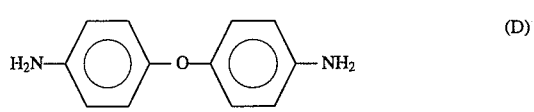

as a second diamine component into polyimide having recurring structural units of the above formula (C). As a result, polyimide of the formula (C) is made amorphous and a polyimide copolymer capable of being melt-processed at decreased temperature can be obtained (Japanese Patent Application HEI 01-90674). The polyimide copolymer, however, is also less-than-perfectly amorphous and has a defect of crystallization on standing for a long time at high temperature.

In order to solve such problem of polyimide, investigations have been tried to improve diamine components in the raw material.

For example, it has been tried to control glass transition temperature, melt flowability or crystallinity of polyimide by change of bonding radicals in monomer units, extension of polymer chain, or introduction of unsymmetrical structure, bent structure or bulky substituent.

Polyimide which is excellent in heat resistance and adhesion, has sufficient flowability in a molten state, and is outstanding in processability is still in the research-and-development stage.

SUMMARY OF THE INVENTION

The object of the invention is to provide an amorphous polyimide which is thermoplastic and has good processability in addition to essentially excellent heat resistance of polyimide and an aromatic diamine which is useful as a raw material of polyimide.

As a result of an intensive investigation in order to solve the above problems, the present inventors have found that a monomer component of aromatic diamine having a specific structure which is substituted by an 3-aminophenoxy radical at the 4-position and an 3-aminobenzoyl radical at the 4'-position, respectively, on an unsubstituted or methyl substituted biphenyl, diphenyl ether or diphenyl sulfide, can provide amorphous polyimide which is thermoplastic and has excellent processability without impairing essential properties of polyimide. Thus the present invention has been completed.

That is, one aspect of the invention is as follows.

(1) An amorphous polyimide comprising a requisite structural unit consisting of one or more recurring structural units represented by the formula (1):

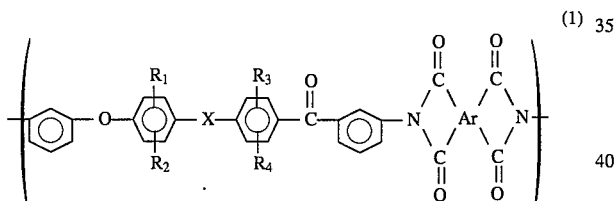

wherein X is a direct bond, oxygen atom or sulfur atom, and $R_1$, $R_2$, $R_3$ and $R_4$ are individually a hydrogen atom or methyl, and Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

(2) An amorphous polyimide comprising a requisite structural unit consisting of one or more recurring structural units represented by the formula (1):

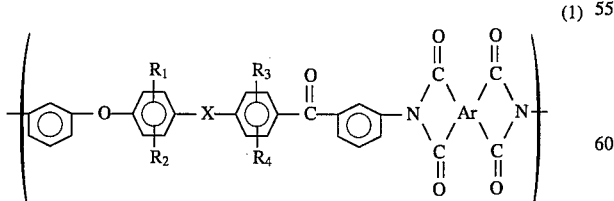

wherein X, $R_1$, $R_2$, $R_3$, $R_4$ and Ar are the same as above, and having at the polymer chain end thereof an aromatic ring which is essentially unsubstituted or substituted with a radical having no reactivity with amine or dicarboxylic anhydride.

(3) The polyimide of the above (1) or (2) comprising a requisite structural unit of one or more recurring structural units represented by the formula (1-1):

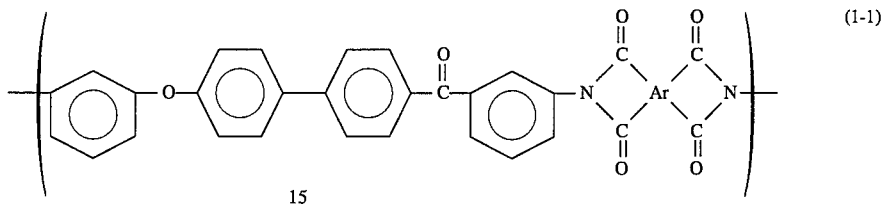

wherein Ar is the same as in the formula (1).

(4) An amorphous polyimide or a polyimide copolymer comprising a requisite structural unit consisting of 1~100 mol % of recurring structural units represented by the formula (1):

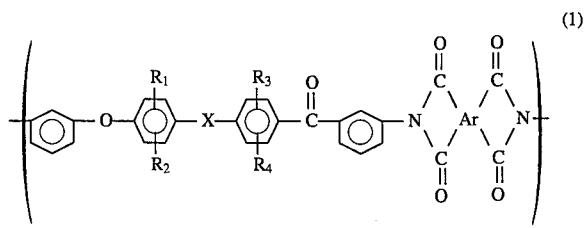

wherein X, $R_1$, $R_2$, $R_3$, $R_4$ and Ar are the same as above, and 99~0 mol % of recurring structural units represented by the formula (2):

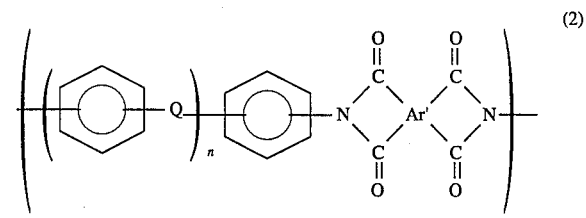

wherein n is an integer of 0 to 6; Q is a direct fond, -O-, -S-, -CO-, -$SO_2$-, -$CH_2$-, -C($CH_3$)$_2$- or -C($CF_3$)$_2$-, and when two or more bonding radicals Q connect aromatic rings to each other, the bonding radicals Q can be the same or different; and Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member; or amorphous polyimide or a polyimide copolymer having at the polymer chain end a radical which is essentially unsubstituted or substituted with a radical having no reactivity with amine or dicarboxylic anhydride.

(5) A preparation process of an amorphous polyimide having a requisite structural unit consisting of one or more recurring structural units represented by the formula (1):

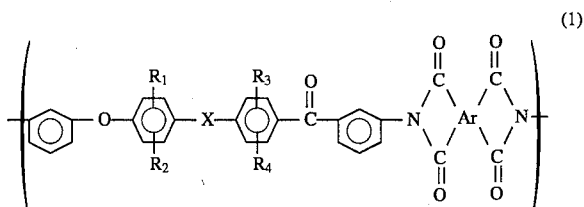 (1)

wherein X, $R_1$, $R_2$, $R_3$, $R_4$ and Ar are the same as above, comprising reacting aromatic diamine consisting essentially of one or more aromatic diamino compounds represented by the formula (3):

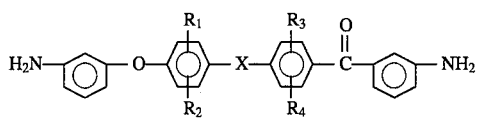 (3)

wherein X is a direct bond, oxygen atom or sulfur atom, and $R_1$, $R_2$, $R_3$ and $R_4$ are individually a hydrogen atom or methyl, with tetracarboxylic dianhydride essentially represented by the formula (4):

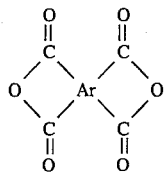 (4)

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member; and thermally or chemically imidizing the resulting polyamic acid.

(6) A preparation process of an amorphous polyimide having a requisite structural unit consisting of one or more recurring structural units represented by the formula (1):

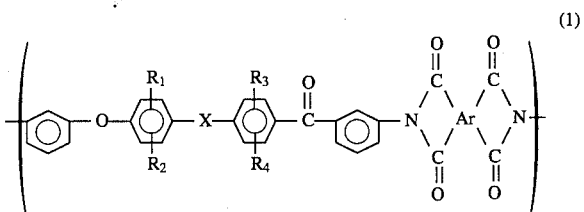 (1)

wherein X, $R_1$, $R_2$, $R_3$, $R_4$ and Ar are the same as above, and having at the polymer chain end thereof an aromatic ring which is essentially unsubstituted or substituted with a radical having no reactivity with amine or dicarboxylic anhydride, comprising reacting aromatic diamine consisting essentially of one or more aromatic diamino compounds represented by the formula (3):

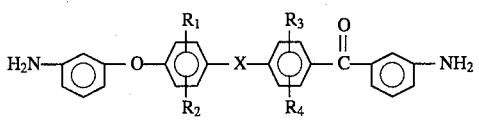 (3)

wherein X, $R_1$, $R_2$, $R_3$ and $R_4$ are the same as above, with tetracarboxylic dianhydride essentially represented by the formula (4):

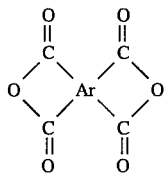 (4)

wherein Ar is the same as above, in the presence of aromatic dicarboxylic anhydride represented by the formula (5):

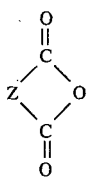 (5)

wherein Z is a divalent radical having 6 to 15 carbon atoms and being selected from the group consisting of a monoaromatic radical, condensed polyaromatic radical and noncondensed polyaromatic radical having aromatic radicals connected to each other with a direct bond or bridge member, or aromatic monoamine represented by the formula (6):

$Z_1$-$NH_2$ (6)

wherein $Z_1$ is a monovalent radical having 6 to 15 carbon atoms and being selected from the group consisting of a monoaromatic radical, condensed polyaromatic radical and noncondensed polyaromatic radical having aromatic radicals connected to each other with a direct bond or a bridge member; and thermally or chemically imidizing the resulting polyamic acid.

(7) A preparation process of polyimide or a polyimide copolymer of the above (4), comprising reacting 1~0.01 parts by mole of aromatic diamine represented by the formula (3):

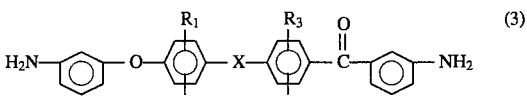 (3)

wherein X, $R_1$, $R_2$, $R_3$ and $R_4$ are the same as above, with 1~0.01 parts by mole of tetracarboxylic dianhydride essentially represented by the formula (4):

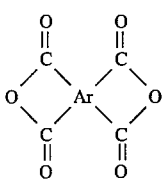 (4)

wherein Ar is the same as above, and further reacting 0~0.99 parts by mole of one or more aromatic diamines represented by the formula (9):

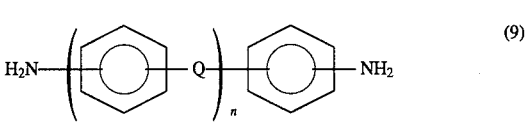 (9)

wherein n is an integer of 0~6, and Q is a direct bond, -O-, -S-, -CO-, -$SO_2$-, -$CH_2$-, -C($CH_3$)$_2$- or -C($CF_3$)$_2$-, and when two or more bonding radicals Q connect aromatic rings to each other, the bonding radicals Q can be the same or different, with 0~0.99 parts by mole of tetracarboxylic dianhydride represented by the formula (10):

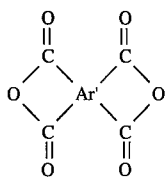

(10)

wherein Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

(8) A preparation process of polyimide or a polyimide copolymer of the above (7), comprising carrying out the above reaction in the presence of 0.001~1.0 mol of aromatic dicarboxylic anhydride represented by the formula (5):

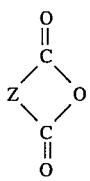

(5)

wherein Z is the same as above, for 1 mol of total aromatic diamine, or in the presence of 0.001~1.0 mol of aromatic monoamine represented by the formula (6)

 (6)

wherein $Z_1$ is the same as above, for 1 mol of total tetracarboxylic dianhydride; and thermally or chemically imidizing the resulting polyamic acid.

Further aspects of the invention relate as follows to novel aromatic compounds which can be used as a monomer of polyimide in the invention.

(9) An aromatic diamino compound represented by the formula (3):

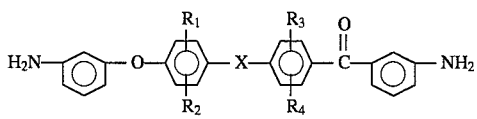

(3)

wherein X, $R_1$, $R_2$, $R_3$ and $R_4$ are the same as above.

Following diamino compounds are preferred in particular.

(10) An aromatic diamino compound represented by the formula (3-1):

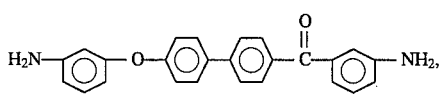

(3-1)

(11) A preparation process of an aromatic diamino compound represented by the formula (3):

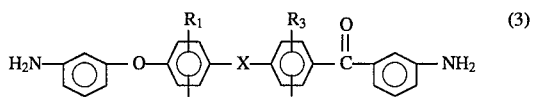

(3)

wherein X, $R_1$, $R_2$, $R_3$ and $R_4$ are the same as above, comprising conducting condensation of a phenol compound represented by the formula (7):

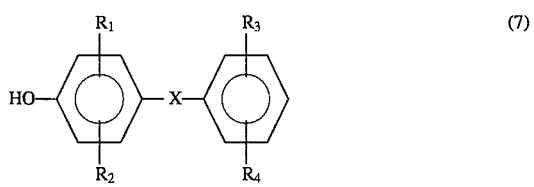

(7)

wherein X is a direct bond, oxygen atom or sulfur atom, and $R_1$, $R_2$, $R_3$ and $R_4$ are individually a hydrogen atom or methyl, with m-dinitro benzene in an aprotic polar solvent in the presence of a base, performing a Friedel-Crafts reaction of the resulting aromatic nitro compound represented by the formula (8):

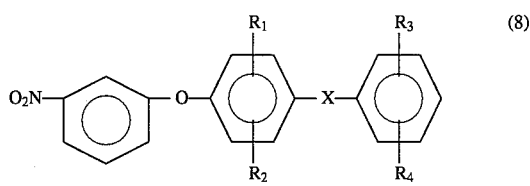

(8)

wherein X is a direct bond, oxygen atom or sulfur atom, and $R_1$, $R_2$, $R_3$ and $R_4$ are individually a hydrogen atom or methyl, with m-nitrobenzoyl chloride, and reducing the resulting aromatic dinitro compound represented by the formula (9):

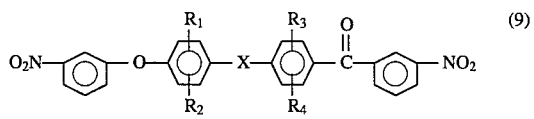

(9)

wherein X is a direct bond, oxygen atom and sulfur atom, and $R_1$, $R_2$, $R_3$ and $R_4$ are individually a hydrogen atom or methyl.

Still further aspects of the invention relate to polyimide based resin compositions and polyimide articles.

(12) A polyimide based resin composition comprising 100 parts by weight of polyimide or a polyimide copolymer of the above (4) and 5 to 70 parts by weight of a fibrous reinforcement selected from carbon fiber, glass fiber, aromatic polyamide fiber and potassium titanate fiber.

(13) An injection molded article obtained from the polyimide based resin composition.

(14) A polyimide film comprising polyimide or the polyimide copolymer of the invention.

Polyimide or the polyimide copolymer obtained by the invention has excellent heat resistance, is outstanding in melt-flow stability, has greatly improved processability, and can be applied to structural materials, and electric-electronic appliance.

DETAILED DESCRIPTION OF THE INVENTION

Figure 1:
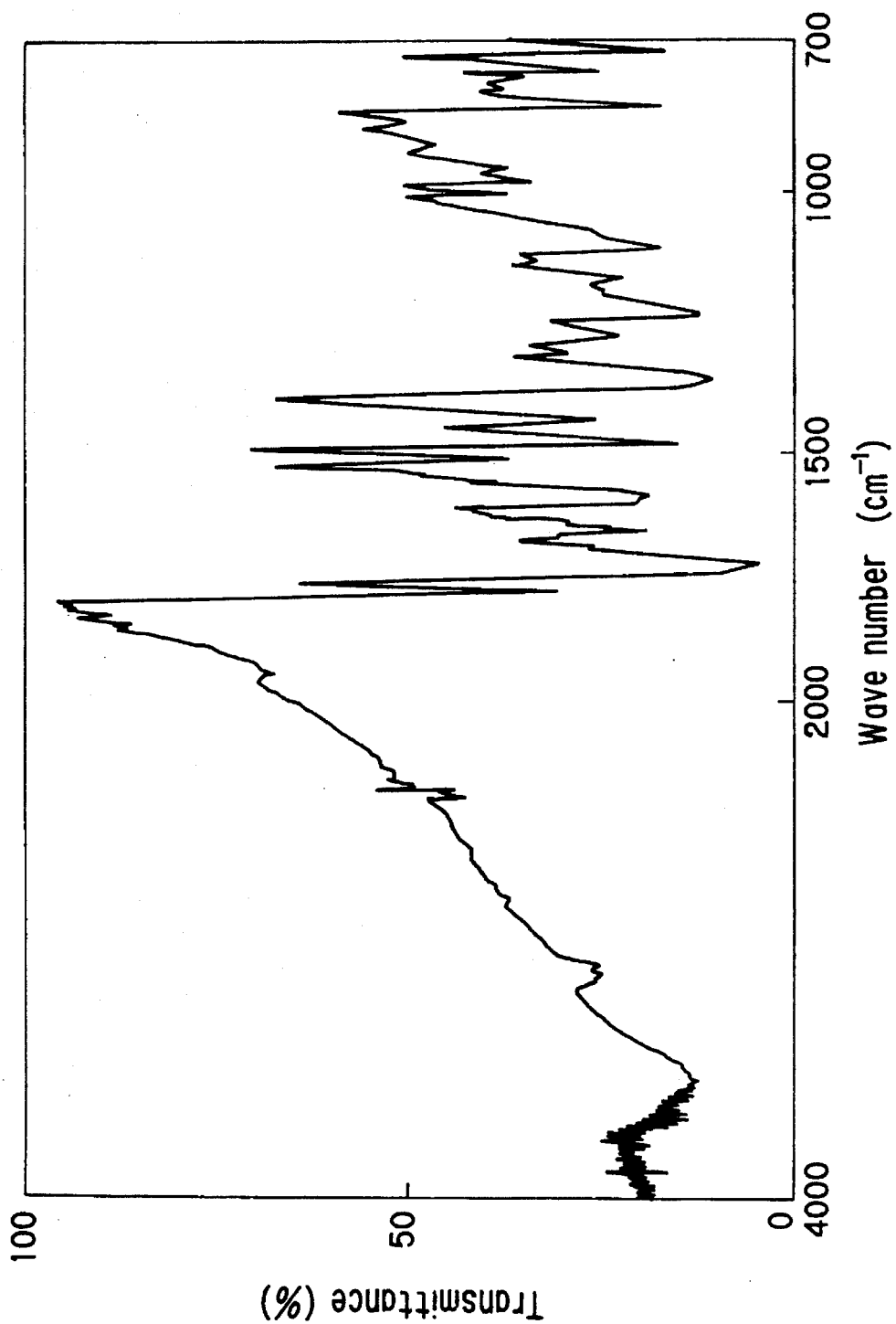
FIG. 1 is an infrared absorption spectrum atlas of the polyimide powder obtained in Example 2.

Polyimide of the invention comprises a requisite structural unit consisting of one or more recurring structural units represented by the formula (1):

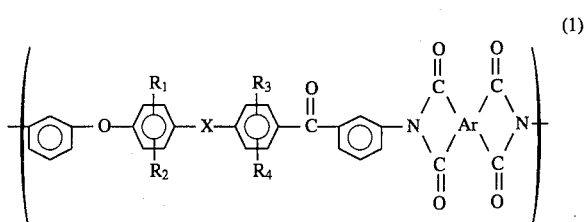

wherein X, $R_1$, $R_2$, $R_3$, $R_4$ and Ar are the same as above.

Particularly preferred polyimide comprises a requisite structural unit consisting of recurring structural units represented by the formula (1-1):

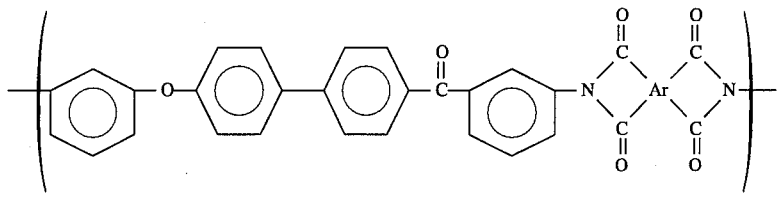

wherein Ar is the same as above.

Further, polyimide or a polyimide copolymer of the invention comprises a requisite structural unit consisting of 1~100 mol % of recurring structural units represented by the above formula (1) and 99~0 mol % of recurring structural units represented by the formula (2):

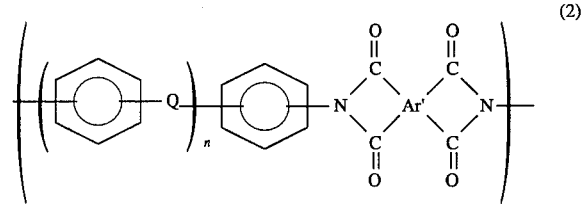

wherein n, Q and Ar' are the same as above. The polyimide copolymer comprises the recurring structural units represented by the formula (1) in a proportion of preferably 50 mol % or more, more preferably 70 mol % or more.

Polyimide or the polyimide copolymer can also have at the polymer chain end an aromatic ring which is essentially unsubstituted or substituted with a radical having no reactivity with amine or dicarboxylic anhydride.

Polyimide having recurring structural units represented by the above formula (1) can be prepared by reacting aromatic diamine essentially consisting of one or more aromatic diamino compound represented by the formula (3):

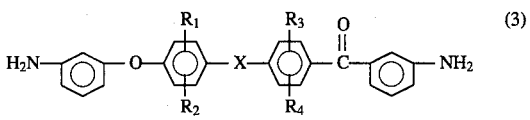

wherein X, $R_1$, $R_2$, $R_3$ and $R_4$ are the same as above, with tetracarboxylic dianhydride essentially represented by the formula (4):

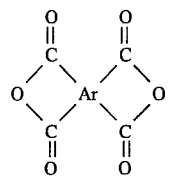

wherein Ar is the same as above, and thermally or chemically imidizing the resulting polyamic acid.

The aromatic diamino compound used for preparing polyimide of the invention is aromatic diamine represented by the formula (3):

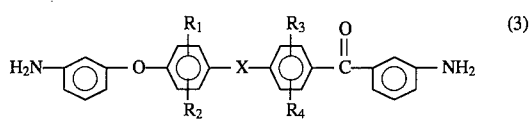

wherein X, $R_1$, $R_2$, $R_3$ and $R_4$ are the same as above, for example, 4-(3-aminophenoxy)-4'-(3-aminobenzoyl)biphenyl, 4-(3-aminophenoxy)-4'-(3-aminobenzoyl)diphenylether, 4-(3-aminophenoxy)-4'-(3-aminobenzoyl)diphenylsulfide, and other diamine compounds represented by the formula (3) having one methyl group such as 4-(3-aminophenoxy)-4'-(3-aminobenzoyl)-2-methylbiphenyl, 4-(3-aminophenoxy)-4'-(3-aminobenzoyl)-2-methyldiphenylether, 4-(3-aminophenoxy)-4'-(3-aminobenzoyl)-2-methyldiphenylsulfide, 4-(3-aminophenoxy)-4'-(3-aminobenzoyl)-2'-methylbiphenyl, 4-(3-aminophenoxy)-4'-(3-aminobenzoyl)-2'-methyldiphenylether, 4-(3-aminophenoxy)-4'-(3-aminobenzoyl)-2'-methyldiphenylsulfide, and 4-(3-aminophenoxy)-4'-(3-aminobenzoyl)biphenyl, 4-(3-aminophenoxy)-4'-(3-aminobenzoyl)diphenylether or 4-(3-aminophenoxy)-4'-(3-aminobenzoyl)diphenylsulfide having 2~4 methyl groups. These aromatic diamino compounds can be used singly or as mixture.

Preferable diamine is 4-(3-aminophenoxy)-4'-(3-aminobenzoyl) biphenyl represented by the formula (3-1):

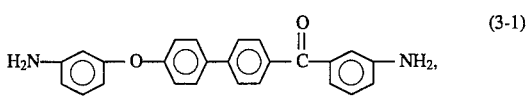

The aromatic diamine of the invention can be prepared, for example, by the process comprising conducting condensation of a phenol compound represented by the formula (7):

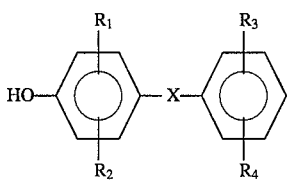

wherein X is a direct bond, oxygen atom and sulfur atom, and $R_1$, $R_2$, $R_3$ and $R_4$ are individually a hydrogen atom and methyl, with m-dinitro benzene in an aprotic polar solvent in the presence of a base, performing a Friedel-Crafts reaction of the resulting aromatic nitro compound represented by the formula (8):

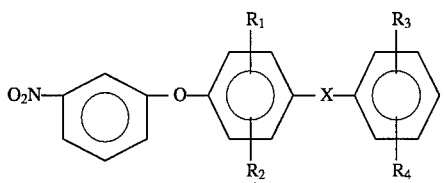

wherein X, $R_1$, $R_2$, $R_3$ and $R_4$ are the same as the formula (7), with m-nitrobenzoyl chloride, and reducing the resulting aromatic dinitro compound represented by the formula (9):

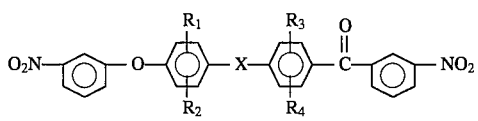

wherein X, $R_1$, $R_2$, $R_3$ and $R_4$ are the same as the formula (7).

The phenol compound used in the process include, in the formula (7),

① all of $R_1$, $R_2$, $R_3$ and $R_4$ are hydrogen atoms, for example, p-phenyl phenol, p-phenoxy phenol, 4-hydroxyphenylsulfide and the like, ② one of $R_1$, $R_2$, $R_3$ and $R_4$ is methyl, for example, 2-methyl-4-hydroxybiphenyl, 4-hydroxy-3'-methylbiphenyl, 2-methyl-4-hydroxydiphenylether, 4-hydroxy-3'-methyldiphenylether, 4-hydroxy-2'-methyldiphenylether, 2-methyl-4-hydroxydiphenylsulfide, 4-hydroxy-3'-methyldiphenylsulfide, 4-hydroxy-2'-methyldiphenylsulfide and the like, ③ two of $R_1$, $R_2$, $R_3$ and $R_4$ are methyl, for example, 4-hydroxy-2,5-dimethylbiphenyl, 4-hydroxy-3,3'-dimethylbiphenyl, 4-hydroxy-3',5'-dimethylbiphenyl, 4-hydroxy-3,5-dimethyldiphenyether, 4-hydroxy-3,2'-dimethyldiphenylether, 4-hydroxy-2,6'-dimethyldiphenylether, 4-hydroxy-2,2'-dimethyldiphenylsulfide, 4-hydroxy-2,3-dimethyldiphenylsulfide, 4-hydroxy-2',5'-dimethyldiphenylsulfide and the like, ④ three of $R_1$, $R_2$, $R_3$ and $R_4$ are methyl, for example, 4-hydroxy-2,3,5-trimethylbiphenyl, 4-hydroxy-3,5,2'-trimethylbiphenyl, 4-hydroxy-2,2',3'-trimethylbiphenyl, 4-hydroxy-2',3',5'-trimethylbiphenyl, 4-hydroxy-2,3,6-trimethyldiphenylether, 4-hydroxy-2,6,2'-trimethyldiphenylether, 4-hydroxy-2,3',5'-trimethyldiphenylether, 4-hydroxy-2',3',6'-trimethyldiphenylether, 4-hydroxy-2,3,6-trimethyldiphenylsulfide, 4-hydroxy-2,5,3'-trimethyldiphenylsulfide, 4-hydroxy-3,2',5'-trimethyldiphenylsulfide, 4-hydroxy-2',3',5'-trimethyldiphenylsulfide and the like, ⑤ All of $R_1$, $R_2$, $R_3$ and $R_4$ are methyl, for example, 4-hydroxy-2,3,5,6-tetramethylbiphenyl, 4-hydroxy-2,3,5,2'-tetramethylbiphenyl, 4-hydroxy-2,3,2',5'-tetramethylbiphenyl, 4-hydroxy-2,2',3',5'-tetramethylbiphenyl, 4-hydroxy-2',3',5',6'-tetramethylbiphenyl, 4-hydroxy-2,3,5,3'-tetramethyldiphenylether, 4-hydroxy-2,3,2',5'-tetramethyldiphenylether, 4-hydroxy-2,3',3',6'-tetramethyldiphenylether, 4-hydroxy-2,3,6,2'-tetramethyldiphenylsulfide, 4-hydroxy-2,3,3',5'-tetramethyldiphenylsulfide, 4-hydroxy-3,2',3',5'-tetramethyldiphenylsulfide and the like.

A phenol compound of the formula (7) besides the above exemplified phenol compounds also can be used in the process.

In the first step reaction of the process, a phenol compound of the formula (7) is subjected to condensation with m-dinitrobenzene in an aprotic polar solvent in the presence of a base.

In the process, 1 equivalent or more of m-dinitrobenzene is sufficient for the amount of phenols. Preferred range of use is 1~1.5 equivalents in consideration of complex post treatment and cost increase.

The base which can be used in the process is carbonate, hydrogen carbonate, hydroxide or alkoxide of alkali metals.

Exemplary bases include potassium carbonate, potassium hydrogen carbonate, potassium hydroxide, sodium carbonate, sodium hydroxide, sodium hydrogen carbonate, lithium carbonate, lithium hydroxide, sodium methoxide and potassium isopropoxide. The amount of these bases used is 1 equivalent or more, preferably 1~2 equivalents for phenols as raw material.

Solvents which can be used in the process is an aprotic polar solvent, and representative solvents include formamide, N-methylformamide, N,N-dimethylformamide, N,N-diethylformamide, N,N-dimethylacetamide, N-methylpyrrolidone, 1,3-dimethyl-2-imidazolidinone, dimethylsulfoxide and sulfolane. No particular limitation is imposed upon the amount of these solvents. Usually, 1~10 times by weight of the solvent is sufficient for the weight of raw materials.

A catalyst for accelerating the reaction can be used in the process. Exemplary catalysts include copper powder and copper compounds, and phase transfer catalysts such as crown ether, polyethylene glycol, quaternary ammonium base and quaternary phosphonium base.

Reaction temperature is usually in the range of 40°~250° C., preferably in the range of 80°~180° C.

In a reaction procedure of the process, a prescribed amount of the phenol compound, base and solvent is charged to a reaction vessel in order to convert the phenol compound into an alkali metal salt, and m-dinitrobenzene is successively added to progress the reaction. In another reaction procedure, the whole materials including m-dinitrobenzene are charged at the same time and heated as intact to promote the reaction. No restriction is imposed upon the reaction procedure and any other procedures can also be suitably carried out.

When water is present in the reaction system, water can be removed out of the reaction system by ventilating nitrogen gas in the course of the reaction. Generally, a procedure for azeotropically removing water out of the reaction system is frequently carried out by using a small amount of benzene, toluene, xylene or chlorobenzene.

End point of the reaction can be determined according to decrease in the amount of the raw material by thin layer chromatography or high performance liquid chromatography.

After finishing the reaction, the reaction mixture is poured after concentration or as intact into water to obtain crude nitro compound represented by the formula (8). The crude nitro compound can be purified by recrystallization from or sludging with a solvent.

In second step reaction of the process, Friedel-Crafts reaction of the said nitro compound represented by the formula (8) and m-nitro benzoyl chloride is carried out.

In the process, 1 equivalent or more of the m-nitro benzoyl chloride is sufficient for the amount of the nitro compound. Preferred range of use is 1~1.5 equivalents.

Lewis acid catalyst such as chloride or bromide of aluminum, gallium, antimony, iron, tin, titanium or zinc, which is usually used as catalyst for Friedel-Crafts acylation can also be used as catalysts in the process. Preferred catalyst is aluminium chloride by considering reactivity, cost and others. In the process, amount of the catalyst is 1 equivalent or more for the amount of the nitro compound, preferably 1 ~1.5 equivalents.

No particular limitation is imposed upon solvents used in the process. Solvents which is inactive to acid chloride or Lewis acid catalyst may be used as solvent. Representative solvents which can be used in the process include carbon disulfide, acetonitrile and dichloroethane.

Preferred solvent is dichloroethane in view point of boiling point, safety, toxicity and like. No particular limitation is imposed upon the amount of these solvents. Usually, 1~10 times by weight of the solvent is sufficient for the weight of raw materials.

Reaction temperature is usually in the range of 0°~150° C., preferably in the range of 20°~100° C.

End point of the reaction can be determined according to decrease in the amount of the raw material by thin layer chromatography or high performance liquid chromatography in a similar manner as first step reaction.

After finishing the reaction, the reaction mixture is poured into ice water and then is separated into water layer and organic layer. The organic layer separated is washed by water and is concentrated to obtain crude dinitro compound represented by the formula (9). The crude dinitro compound can be purified by recrystallization from or sludging with a solvent.

The corresponding aromatic diamino compound represented by the formula (3) can be prepared by reducing the aromatic dinitro compound obtained by the preparation process through the above first and second steps.

No particular restriction is placed upon the reduction method of the dinitro compound.

A method for reducing a nitro radical to an amino radical described, for example, in Shin Jikken Kagaku Koza, vol. 15, Oxidation and Reduction II, Published from Maruzen (1977), can be usually applied.

Exemplary reductions include, for example, Bechamp reduction by using iron powder or tin powder and hydrochloric acid, reduction by sulfide such as sodium sulfide and sodium hydrosulfide, reduction by hydrazine, or reduction by formic acid or formate and noble metal, and catalytic reduction by using Raney catalyst or noble metal catalyst. The method for reduction preferred in industry is catalytic reduction which nickel, palladium, platinum, rhodium, ruthenium, cobalt or copper is used as catalysts.

As the aromatic dinitro compound of the formula (9) has carbonyl radical in the structure, catalytic reduction is liable to cause side reaction which the carbonyl radical is hydrogenated. Accordingly, Bechamp reduction is preferred reduction method in order to suppress the side reaction.

No particular restriction is imposed upon the solvents used in the reduction as long as inactive for the reaction.

Preferred solvents include, for example, methanol, ethanol, isopropyl alcohol and other alcohols; ethylene glycol, propylene glycol and other glycols; ether, dioxane, tetrahydrofuran, methyl cellosolve and other ethers. Other solvents which can also be used in some cases are hexane, cyclohexane and other aliphatic hydrocarbons; benzene, toluene, xylene and other aromatic hydrocarbons; and dichloromethane, chloroform, carbon tetrachloride, 1,2-dichloroethane, 1,1,2-trichloroethane, tetrachloroethane and other halogenated hydrocarbons.

No particular limitation is placed on the reaction temperature. In the case of iron powder reduction, the reaction temperature is in the range of usually 10° to 150° C., preferably 20° to 80° C. In the case of Bechamp reduction, the reaction temperature is in the range of usually 50° to 200° C., preferably 70° to 150° C.

End point of the reaction can be determined by the amount of hydrogen, thin layer chromatography or high performance liquid chromatography. After finishing the reaction, the catalyst is removed by filtration and the solvent is distilled out of the filtrate to obtain the desired product.

By the above-mentioned processes, the aromatic diamino compounds of the invention, which correspond to the phenols represented by the formula (7), can be prepared and are used for preparing the polyimide or the polyimide copolymer of the invention.

Aromatic tetracarboxylic dianhydride which can be used in the invention is one or more compounds represented by the formula (4):

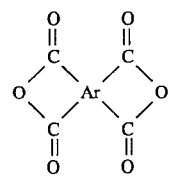
(4)

wherein Ar is same as above.

In the aromatic tetracarboxylic dianhydride of the formula (4), Ar is monoaromatic radical of the formula (a):

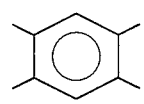
(a)

condensed polyaromatic radical of the formula (b):

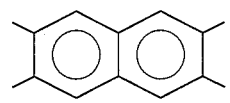
(b)

and noncondensed aromatic radical being connected to each other with a direct bond or a bridge member and having the formula (c):

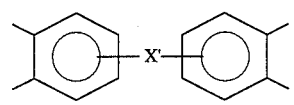
(c)

wherein X' is a direct bond, -CO-, -O-, -S-, -SO$_2$-, -CH$_2$-, -C(CH$_3$)$_2$-, -C(CF$_3$)$_2$-,

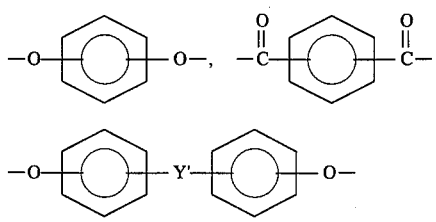

wherein Y' is a direct bond, -CO-, -O-, -S-, -SO$_2$-, -CH$_2$-, -C(CH$_3$)$_2$- or -C(CF$_3$)$_2$-.

Exemplary tetracarboxylic dianhydride of the formula (4) which can be used in the invention include, pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(3,4-dicarboxyphenyl)sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,2-bis(3,4-dicarboxyphenyl)-1,1,1,3,3,3-hexafluoropropane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride.

These dianhydrides can be used singly or as a mixture.

The ratio of aromatic tetracarboxylic dianhydride to aromatic diamine is usually adjusted in the preparation of polyimide in order to control the molecular weight of formed polyimide. In the process of the invention, an appropriate mol ratio of aromatic tetracarboxylic dianhydride to aromatic diamine in order to obtain polyimide of good melt-flowability is in the range of 0.9~1.0.

Polyimide of the invention obtained by using the above aromatic diamine and aromatic tetracarboxylic dianhydride as monomer components has requisite structural units comprising recurring structural units essentially represented by the formula (1).

A polyimide copolymer comprising recurring structural units represented by the above formula (1) and recurring structural units represented by the above formula (2) can be obtained by using as monomers a mixture of aromatic diamine of the invention with one or more other aromatic diamines and one or more aromatic tetracarboxylic dianhydrides.

The polyimide copolymer comprising recurring structural units represented by the formula (1) and recurring structural units represented by the formula (2) can be prepared in the presence of one or more aromatic diamines represented by the formula (9):

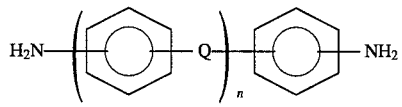

wherein n is an integer of 0~6 and Q is a direct bond, -O-, -S-, -CO-, -SO$_2$-, -CH$_2$-, -C(CH$_3$)$_2$- or -C(CF$_3$)2- and when two or more bonding radicals Q connect aromatic rings to each other, the bonding radicals Q can be the same or different, by reacting aromatic diamine represented by the formula (3):

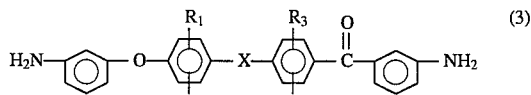

wherein X, R$_1$, R$_2$, R$_3$ and R$_4$ are the same as above, with one or more tetracarboxylic dianhydride represented by the formula (10)

wherein Ar' is the same as above.

Useful aromatic diamines represented by the formula (9) include, for example, m-phenylenediamine, o-phenylenediamine, p-phenylenediamine, benzidine, 4,4'-diaminodiphenyl ether, 3,3'-diaminodiphenyl ether, 3,4'-diaminodiphenyl ether, bis(3-aminophenyl)sulfide, (3-aminophenyl)(4-aminophenyl)sulfide, bis(4-aminophenyl)sulfide, bis(3-aminophenyl)sulfone, (3-aminophenyl)(4-aminophenyl)sulfone, bis(4-aminophenyl)sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, 2,2-bis(4-aminophenyl)propane, 2,2-bis(3-aminophenyl)propane, 2-(3-aminophenyl)-2-(4-aminophenyl)propane, 2,2-bis(4-aminophenyl)-1,1,1,3,3,3-hexafluoropropane, 2,2-bis(3-aminophenyl)-1,1,1,3,3,3-hexafluoropropane, 2-(3-aminophenyl)-2-(4-aminophenyl)-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 3,3'-diamino-4-phenoxybenzophenone, 4,4'-diamino-5-phenoxybenzophenone, 3,4'-diamino-4-phenoxybenzophenone, 3,4'-diamino-5'-phenoxybenzophenone, 4,4'-bis(4-aminophenoxy)biphenyl, 3,3'-bis(4-aminophenoxy)biphenyl, 3,4'-bis(3-aminophenoxy)biphenyl, bis[4-(4-aminophenoxy)phenyl]ketone, bis[4-(3-aminophenoxy)phenyl]ketone, bis[3-(4-aminophenoxy)phenyl]ketone, bis[3-(3-aminophenoxy)phenyl]ketone, 3,3'-diamino-4,4'-diphenoxybenzophenone, 4,4'-diamino-5,5'-diphenoxybenzophenone, 3,4'-diamino-4,5'-diphenoxybenzophenone, bis[4-(4-aminophenoxy)phenyl]sulfide, bis[4-(3-aminophenoxy)phenyl]sulfide, bis[3-(4-aminophenoxy)phenyl]sulfide, bis[3-(3-aminophenoxy)phenyl]sulfide, bis[4-(4-aminophenoxy)phenyl]sulfone, bis[4-(3-aminophenoxy)phenyl]sulfone, bis[3-(4-aminophenoxy)phenyl]sulfone, bis[3-(3-aminophenoxy)phenyl]sulfone, bis[4-(4-aminophenoxy)phenyl]ether, bis[4-(3-aminophenoxy)phenyl]ether, bis[3-(4-aminophenoxy)phenyl]ether, bis[3-(3-aminophenoxy)phenyl]ether, bis[4-(4-aminophenoxy)phenyl]methane, bis[4-(3-aminophenoxy)phenyl]methane, bis[3-(4-aminophenoxy)phenyl]methane, bis[3-(3-aminophenoxy)phenyl]methane, 2,2-bis[4-(3- aminophenoxy)phenyl]propane, 2,2-bis[4-(4-aminophenoxy)phenyl]propane, 2,2-bis[3-(3-aminophenoxy)phenyl]propane, 2,2-bis[3-(4-aminophenoxy)phenyl]propane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 1,4-bis[4-(3-aminophenoxy)benzoyl]benzene, 1,3-bis[4-(3-aminophenoxy)benzoyl]benzene, 1,3-bis(3-amino-4-phenoxybenzoyl)benzene, 1,4-bis(3-amino-4-phenoxybenzoyl)benzene, 1,3-bis(4-amino-5-phenoxybenzoyl)benzene, 1,4-bis(4-amino-5-phenoxybenzoyl)benzene, 4,4'-bis[3-(4-aminophenoxy)benzoyl]diphenyl ether, 4,4'-bis[3-(3-aminophenoxy)benzoyl]diphenyl ether, 4,4'-bis[4-(4-amino-α,α-dimethybenzyl)phenoxy]benzophenone, 4,4'-bis[4-(4-amino-α,α-dimethybenzyl)phenoxy]diphenyl sulfone, bis[4-{4-(4-aminophenoxy) phenoxy} phenyl]sulfone, 3,3'-diamino-4,4'-dibiphenoxybenzophenone, 4,4'-diamino-5,5'-dibiphenoxybenzophenone, 3,4'-diamino-4,5'-dibiphenoxybenzophenone, 1,3-bis(3-amino-4-biphenoxybenzoyl)benzene, 1,4-bis(3-amino-4-biphenoxybenzoyl)benzene, 1,3-bis(4-amino-5-biphenoxybenzoyl)benzene, 1,4-bis(4-amino-5-biphenoxybenzoyl)benzene, 1,4-bis[4-(4-aminophenoxy)phenoxy-α,α-dimethybenzyl]benzene, 1,3-bis[4-(4-aminophenoxy)phenoxy-α,α-dimethybenzyl] benzene, 1,3-bis[4-(4-amino-6-trifluoromethylphenoxy)-α,α-dimethybenzyl]benzene, 1,3-bis[4-(4-amino-6-fluorophenoxy)-α,α-dimethybenzyl]benzene, 1,3-bis[4-(4-amino-6-methylphenoxy)-α,α-dimethybenzyl]benzene, 1,3-bis[4-(4-amino-6-cyanophenoxy)-α,α-dimethybenzyl] benzene, 1,3-bis(3-amino-4-biphenoxybenzoyl)benzene, 1,4-bis(3-amino-4-biphenoxybenzoyl)benzene, 1,3-bis(4-amino-5-biphenoxybenzoyl)benzene, and 1,4-bis(4-amino-5-biphenoxybenzoyl)benzene, These aromatic diamines can be used singly or as a mixture.

Any compounds enumerated as examples of the above general formula (4) can be used as tetracarboxylic dianhydride represented by the formula (10) which is used for another monomer. Tetracarboxylic dianhydride represented by the formula (10) can be the same as or differ from the tetracarboxylic anhydride represented by the formula (4). Tetracarboxylic dianhydride for use in the preparation of the polyimide copolymer can be used singly or as a mixture.

In the preparation of polyimide or a polyimide copolymer, proportion of the aromatic diamine component and the aromatic tetracarboxylic dianhydride component is 1~0.01 parts by mole of aromatic diamine represented by the formula (3) and 1~0.01 parts by mole of aromatic tetracarboxylic dianhydride represented by the formula (4), and additionally 0~0.99 parts by mole of aromatic diamine represented by the formula (9) and 0~0.99 parts by mole of aromatic tetracarboxylic dianhydride represented by the formula (10). In the case of the polyimide copolymer, proportion of aromatic diamine represented by the formula (3) is preferably 0.5 parts by mole or more, more preferably 0.7 parts by mole or more.

Polyimide and the polyimide copolymer of the invention includes a homopolymer and copolymer having at the polymer chain end an aromatic ring which is unsubstituted or substituted with a radical having no reactivity with amine or dicarboxylic anhydride, and a composition comprising the homopolymer or copolymer. These types of product sometimes exhibit better properties.

Polyimide and the polyimide copolymer having at the polymer chain end an aromatic ring which is unsubstituted or substituted with a radical having no reactivity with amine or dicarboxylic anhydride can be obtained from the homopolymer and copolymer which are derived from aromatic diamine essentially represented by the formula (3) or a mixture thereof with other aromatic diamine and one or more tetracarboxylic dianhydride essentially represented by the formula (4), by capping with aromatic dicarboxylic anhydride represented by the formula (5):

wherein Z is the same as above, or aromatic monoamine represented by the formula (6):

wherein $Z_1$ is the same as above, preferably with phthalic anhydride or aniline.

This type of polyimide can be prepared by reacting the aromatic diamine component with aromatic tetracarboxylic dianhydride in the presence of aromatic dicarboxylic anhydride represented by the formula (5) or aromatic monoamine represented by the formula (6), and successively by thermally or chemically imidizing the resulting polyamic acid.

Exemplary aromatic dicarboxylic anhydrides represented by the formula (5) include phthalic anhydride, 2,3-benzophenonedicarboxylic anhydride, 3,4-benzophenonedicarboxylic anhydride, 2,3-dicarboxyphenylphenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride, and 1,9-anthracenedicarboxylic anhydride.

These dicarboxylic anhydrides can be substituted with a radical having no reactivity for amine and dicarboxylic anhydride.

Phthalic anhydride is most preferred in these dicarboxylic anhydrides from the standpoint of properties and practical use of resulting polyimide. That is, resulting polyimide has excellent stability in high temperature processing and is very useful, for example, for structural materials, space and aeronautic equipment, electric and electronic appliances, adhesives in view of high heat resistance and excellent processability.

When phthalic anhydride is used, no restriction is put upon the replacement of a portion of phthalic anhydride by other dicarboxylic anhydride in the range giving no adverse effect on the good properties of polyimide.

Amount of dicarboxylic anhydride is in the range of 0.001~1.0 mol per mol of aromatic diamine. Use of less than 0.001 mol lead to viscosity increase in high temperature processing and causes reduction of processability.

On the other hand, the amount exceeding 1.0 mol leads to decrease in mechanical properties. Thus, preferred range of use is 0.01~0.5 mol.

Aromatic monoamines which can be used include, for example, aniline, o-toluidine, m-toluidine, p-toluidine, 2,3-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anisidine, m-anisidine, p-anisidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophenyl phenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol, 1-aminoanthracene, 2-aminoanthracene and 9-aminoanthracene. These aromatic monoamines can be substituted with a radical having no reacting for amine and dicarboxylic anhydride.

Amount of aromatic monoamine is 0.001~1.0 mol per mol of tetracarboxylic dianhydride. The amount less than 0.001 mol ratio leads to viscosity increase in high temperature processing and reduction of processability. On the other hand, the amount exceeding 1.0 mol ratio results in reduction of mechanical properties. Thus, preferred amount is in the range of 0.01~0.5 mol ratio.

A suitable mol ratio of aromatic tetracarboxylic dianhydride to aromatic diamine in order to obtain polyimide having good melt flowability as above is in the range of 0.9~1.0. Consequently, in the case of preparing polyimide having an unsubstituted or substituted aromatic ring at the polymer chain end thereof, proportion of aromatic tetracarboxylic dianhydride, aromatic diamine and dicarboxylic anhydride or aromatic monomer is 0.9~1.0 mol of aromatic diamine and 0.001~1.0 mol of dicarboxylic anhydride or aromatic monoamine per mol of tetracarboxylic dianhydride.

Any preparation process of polyimide including known processes can be applied to prepare polyimide of the invention. A process for carrying out the reaction in an organic solvent is particularly preferred.

A preferred solvent for such reaction is N,N-dimethylacetamide. Other useful solvents include, for example, N,N-dimethylformamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl] ether, tetrahydrofuran, 1,3-dioxane, 1,4-dioxane, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol, anisole, benzene, toluene and xylenes. These organic solvents can be used singly or as a mixture.

In the process of the invention, the reaction is carried out by the addition of aromatic diamine, aromatic tetracarboxylic dianhydride and aromatic dicarboxylic anhydride or aromatic monoamine to the organic solvent according to the following procedures.

(A) After reacting aromatic tetracarboxylic dianhydride with aromatic diamine, aromatic dicarboxylic anhydride or aromatic monoamine is added to continue the reaction.

(B) After reacting aromatic diamine with aromatic dicarboxylic anhydride, aromatic tetracarboxylic dianhydride is added to continue the reaction.

(C) After reacting aromatic tetracarboxylic dianhydride with aromatic monoamine, aromatic diamine is added to continue the reaction.

(D) Aromatic tetracarboxlic dianhydride, aromatic diamine and aromatic dicarboxylic anhydride or aromatic monoamine are added at one time and the reaction is carried out. Any of the above addition procedures can be conducted.

Reaction temperature is usually 250° C. or less, preferably 50° C. or less. No particular limitation is imposed upon the reaction pressure. Atmospheric pressure is satisfactory for carrying out the reaction. Reaction time differs depending upon the tetracarboxylic dianhydride, solvent and reaction temperature and sufficient time for carrying out the reaction is usually 4 to 24 hours.

Further, polyamic acid thus obtained is thermally imidized by heating at 100° C. to 400° C. or chemically imidized by using an imidizing agent such as acetic anhydride to give polyimide having recurring structural units corresponding to those of polyamic acid.

The desired polyimide can also be prepared by suspending or dissolving in an organic solvent aromatic diamine and aromatic tetracarboxylic dianhydride, and additionally aromatic dicarboxylic anhydride or aromatic monoamine in the case of terminating the polyimide with an aromatic ring, and successively heating the mixture to carry out formation and imidization of the polyimide precursor polyamic acid at the same time.

The solution obtained by dissolving the polyamic acid precursor of polyimide of the invention in N,N-dimethylacetamide in a concentration of 0.5 g/dl has an inherent viscosity of 0.01~3.0 dl/g at 35° C. The solution obtained by heat-dissolving the polyimide powder of the invention in a solvent mixture of P-chlorophenol/phenol (9/1 by weight) in a concentration of 0.5 g/dl has an inherent viscosity of 0.01~3.0 dl/g at 35° C., preferably 0.3~1.5 dl/g.

The polyimide film of the invention can be prepared by casting on a glass plate a varnish of polyamic acid precursor of the polyimide and heating to carry out imidization, by hot-pressing the polyimide powder as intact to form a film or by removing an organic solvent upon heating from the solution dissolved the polyimide to form a film. That is, films and powder of polyimide can be prepared by conventionally known methods.

The polyimide based resin composition of the invention comprises 100 parts by weight of the polyimide or polyimide copolymer of the invention and 5~70 parts by weight, preferably 10~50 parts by weight of fibrous reinforcements such as carbon fiber, glass fiber, aromatic polyamide fiber and potassium titanate fiber. When the amount of the fibrous reinforcements is less than 5 parts by weight, sufficient reinforcing effect cannot be obtained. On the other hand, the amount exceeding 70 parts by weight makes difficult to obtain good molded articles by injection molding or other melt processing methods.

The polyimide based resin composition of the invention can be prepared by a conventionally known process.

Addition of the reinforcements to the polyimide resin can be carried out by usually known methods. For example, in the most common method, polyimide powder and reinforcements are premixed with a mortar, Henschel mixer, drum blender, ball mill and ribbon blender and successively kneaded with a melt mixer or hot rolls to obtain pellets or powdery mixture.

The polyimide resin composition of the invention can be practically applied to melt-processing such as injection molding, extrusion forming, compression molding, rotary molding and other various known processing methods. Polyimide used in the invention has excellent melt flowability in particular, and thus the polyimide resin composition of the invention can be most preferably applied to injection molding process in view of operation efficiency.

In the case of melt-processing the polyimide of the invention, other thermoplastic resin can be blended in a suitable amount depending upon the object for use as long as giving no adverse effect on the good properties of polyimide.

Thermoplastic resins which can be blended include, for example, polyethylene, polypropylene, polycarbonate, polyarylate, polyamide, polysulfone, polyether sulfone, polyether ketone, polyether ether ketone, polyphenylene sulfide, polyamideimide, polyetherimide, modified polyphenyleneoxide and other kinds of polyimides.

Solid lubricants such as molybdenum disulfide, graphite, boron nitride, lead monoxide and lead powder can also be added singly or as a mixture.

Fillers which are used for common resin compositions can be added in the range not impairing the object of the invention. Exemplary fillers include graphite, carborundum, silica powder, molybdenum disulfide, fluoro resin and other wear resistance improvers; antimony trioxide, magnesium carbonate, calcium carbonate and other retardance improvers; clay, mica and other electrical property improvers; asbestos, silica, graphite and other tracking resistance improvers; barium sulfide, silica, calcium metasilicate and other acid resistance improvers; iron powder, zinc powder, aluminum powder, copper powder and other thermal conductivity improvers; and other miscellaneous materials such as glass beads, glass balloons, talc, diatomaceous earth, alumina, silicate balloons, hydrated alumina, metal oxide and colorants.

The present invention will hereinafter be illustrated in detail by way of examples.

Properties of polyimide in the examples were measured by the following methods.

Inherent viscosity:
Polyamic acid was dissolved in N,N-dimethylacetamide and polyimide was dissolved in a solvent mixture of p-chlorophenol/phenol(9/1 by weight), respectively in a concentration of 0.5 g/100 ml. Inherent viscosity was measured at 35° C.

Tg, Tm and Tc:
Measured by DSC with a Shimadzu DT-40 Series DSC-41M.

5% weight loss temperature:
Measured by DTG in the air with a Shimadzu DT-40 Series DTG-40M.

Flow initiation temperature:
Measured with a Shimadzu Koka Type Flow Tester CFT-500A under load of 100 kg at a temperature increase rate of 5° C./min.

Melt viscosity:
Measured with a Shimadzu Koka Type Flow Tester CFT-500A under load of 100 kg.

Tensile strength:
Measured in accordance with ASTM-D-638.

Elongation:
Measured in accordance with ASTM-D-638.

Tensile modulus:
Measured in accordance with ASTM-D-638.

Flexural strength and flexural modulus:
Measured in accordance with ASTM-D-790.

Izod impact strength:
Measured in accordance with ASTM-D-256 (notched specimen).

Heat distortion temperature:
Measured in accordance with ASTM-D-648.

Molding shrinkage:
Measured in accordance with ASTM-D-955.

Example 1

The first step reaction

To a four necked flask equipped with a thermometer, reflux condenser and stirrer, 400 g of N,N-dimethylformamide (DMF), 40 g of toluene, 80 g (0.47 mol) of p-phenylphenol, 86.9 g (0.517 mol) of m-dinitrobenzene, and 35.9 g (0.26 mol) of potassium carbonate were charged. The mixture was heated to 140° C. with stirring and aged at 140° C. for 15 hours. After finishing the reaction, the reaction mixture was cooled to 100° C. and filtered to remove inorganic salts. The filtrate was incorporated with 300 g of water and cooled to room temperature to crystallize the desired product. The precipitated crystals were filtered and recrystallized from a mixture of 380 g of DMF and 100 g of water to obtain 96 g (70% yield) of 4-(3-nitrophenoxy)-1,1'-biphenyl (NPBP).

Melting point: 97.6°~98.8° C.

1H -NMR δ (CDC 13, ppm)

6.96~7.23 (m, 2H) ①

7.27~7.69 (m, 9H) ②

7.81~8.00 (m, 2H) ③

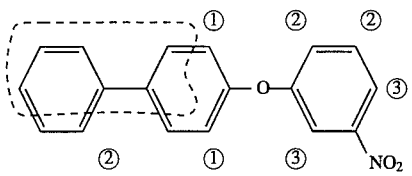

The second step reaction

To a four necked flask equipped with a thermometer, reflux condenser and stirrer, 400 g of 1,2-dichloroethane (EDC), 100 g (0.344 mol) of NPBP, and 55.1 g (0.413 mol) of anhydrous aluminum chloride were charged, and a mixture of 70.3 g of m-nitrobenzoyl chloride and 350 g of EDC was added dropwise at 30° C. with stirring over an hour. After dropwise addition, the reaction mixture was aged for 8 hours at the same temperature. After finishing the reaction, the reaction mass was poured onto 1 kg of crushed ice and stirred for an hour. The precipitate was filtered to obtain 45 g (86% yield) of 4-(3 -nitrophenoxy)-4'-(3-nitrobenzoyl)-1,1'-biphenyl (PBBP).

Melting point: 180.8°~181.4° C.

1H -NMR δ (DMSO-d6, ppm)

7.23~7.33 (m, 2H) ①

6.59~8.26 (m, 12H) ②

8.47~8.57 (m, 2H) ③

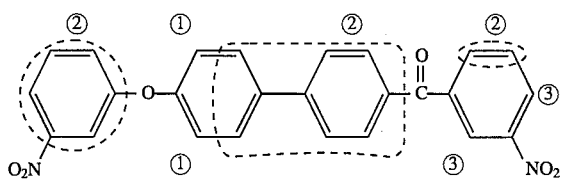

The third step reaction

To a four necked flask equipped with a thermometer, reflux condenser and stirrer, 850 g of methyl cellosolve, 115 g of water, 140 g (0.318 mol) of PBBP and 210 g (3.76 mol) of iron powder were charged and heated to 100° C. with stirring. Successively, a mixture of 26 g of 36% HCl and 60 g of methyl cellosolve was dropwise added and aged at 100° C. for 2 hours. After finishing the reaction, iron oxide was removed by filtration. Water was added to the filtrate. Precipitated crystals were purified in the form of hydrochloride to obtain the desired product 4-(3-aminophenoxy)-4'-(3-aminobenzoyl)-1,1'-biphenyl.

1H -NMR δ (DMSO-d6, ppm)

5.318 (S, 2H) ①

5.465 (S, 2H) ②

6.26~6.59 (m, 3H) ③

6.91~7.37 (m, 7H) ④

7.78~7.87 (m, 6H) ⑤

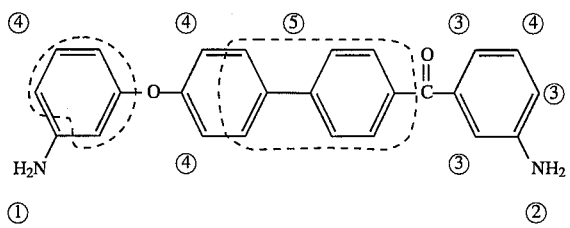

Example 2

To a reaction vessel equipped with a stirrer, reflux condenser and nitrogen inlet tube, 19.02 g (0.05 mol) of 4-(3-aminophenoxy)-4'-(3-aminobenzoyl)biphenyl obtained in Example 1, 10.47 g (0.048 mol) of pyromellitic dianhydride, 0.592 g (0.004 mol) of phthalic anhydride, 0.70 g of γ-picoline and 117.96 g of m-cresol were charged and heated to 150° C. with stirring in a nitrogen atmosphere. Thereafter, the reaction was carried out at 150° C. for 4 hours while distilling out 1.8 ml of water.

After finishing the reaction, the reaction mass was cooled to room temperature and poured into about 1 liter of methyl ethyl ketone. The precipitated polyimide was filtered, washed with methyl ethyl ketone and dried in air at 50° C. for 24 hours and then in a nitrogen atmosphere at 220° C. for 4 hours to obtain 27.09 g (95.8% yield) of polyimide powder. The polyimide powder thus obtained had an inherent viscosity of 0.55 dl/g.

DSC measurement was carried out on the polyimide powder. In the first scanning, a melting point (Tm) was exhibited at 397° C. However, when the sample was rapidly quenched and the second scanning was carried out, a glass transition temperature (Tg) alone was exhibited. Even though the sample was rapidly quenched again and the same measurement was carried out, Tg was emerged alone. That is, the polyimide powder obtained in the Example was essentially amorphous and had a 5% weight loss temperature of 552° C.

FIG. 1 shows an infrared absorption spectrum atlas of the polyimide powder. In the spectrum, remarkable absorption was observed at around 1780 cm$^{-1}$ and 1720 cm$^{-1}$ which are a characteristic absorption band of imide.

Elemental analysis of the polyimide powder

|  | C | H | N |
|---|---|---|---|
| Calculated (%) | 74.72 | 3.23 | 4.98 |
| Found (%) | 75.11 | 3.55 | 4.49 |

Flow initiation temperature of the polyimide powder measured with a Koka Type Flow Tester was 400° C. Melt viscosity at 420° C. after 5 minutes of residence time was 12900 poise.

Figure 2:
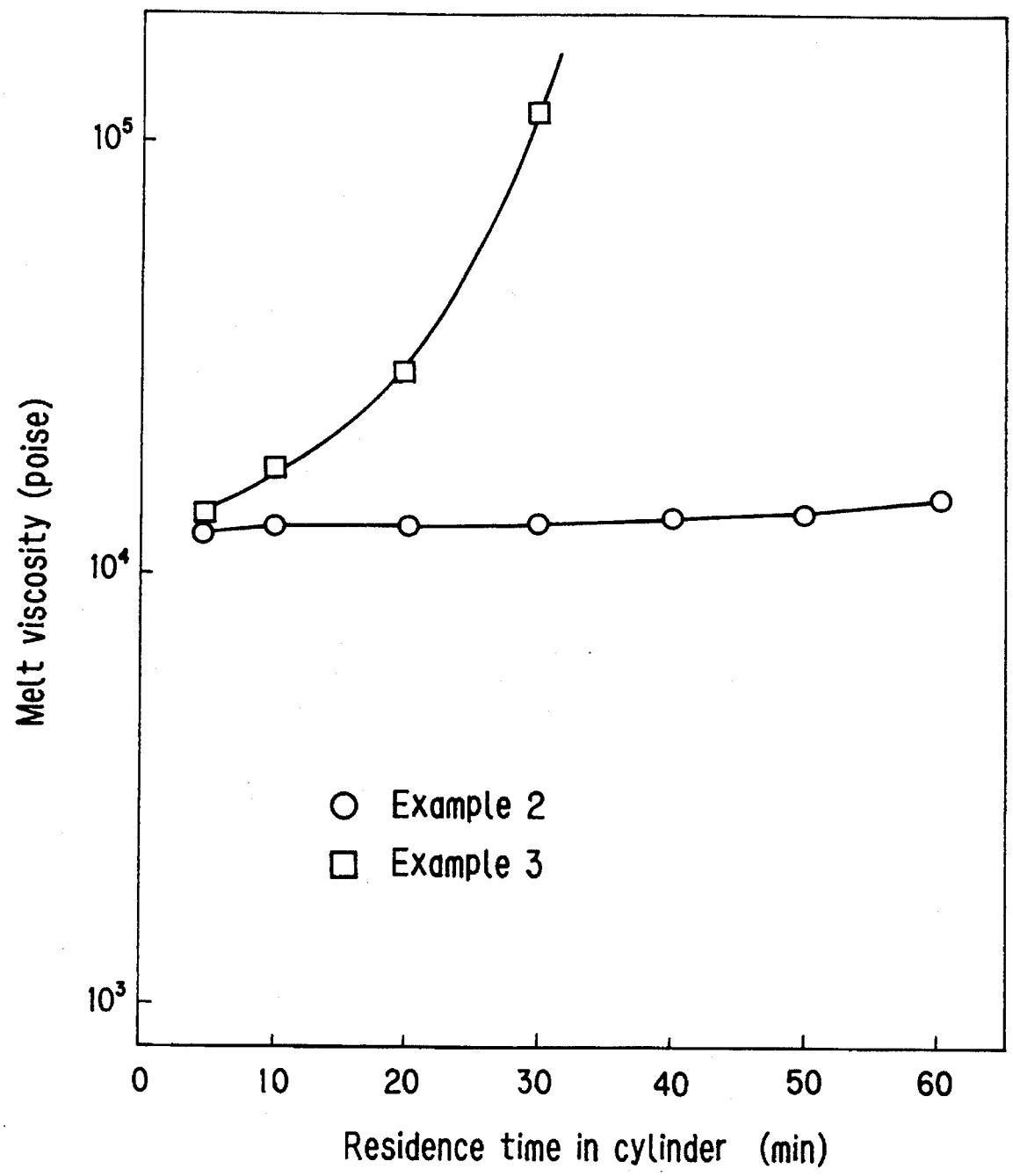
FIG. 2 is results measured on the effect of residence time in the cylinder of a flow tester on the melt viscosity variation of the polyimide powder obtained in Examples 2 and 3.

Processing stability of the polyimide powder was measured by changing residence time in the cylinder of the flow tester, FIG. 2 shows results on processing stability at 420° C. under a 100 kg load.

The melt viscosity led to almost no variation even though residence time on the cylinder was extended and thus exhibits good processing stability.

Example 3

The same procedures as described in Example 2 were carried out except that phthalic anhydride was omitted. Polyimide powder obtained was 27.28 g (93.6% yield) and had an inherent viscosity of 0.59 dl/g. Processing stability of the polyimide powder was measured by the same procedures as Example 1. Results are illustrated in FIG. 2. The melt viscosity was liable to increase with prolonged residence time in the cylinder.

Examples 4 and 5

Polyimide powder was prepared by carrying out the same procedures as described in Example 2 except that acid anhydride components were used as illustrated in Table 1. Table 1 illustrates acid anhydride components, yield, fundamental properties such as inherent viscosity, thermal properties (DSC behavior, 5% weight loss temperature, flow initiate temperature and melt viscosity), together with the results in Example 2.

Comparative Example 1

Polyimide powder was prepared by carrying out the same procedures as described in Example 2 except that 20.42 g (0.05 mol) of 4-(3 -aminophenoxy)-4'-(3-aminobenzoyl)biphenyl was replaced by 18.42 g (0.05 mol) of 4,4'-bis(3-aminophenoxy)biphenyl. Polyimide powder thus obtained was 26.45 (95.6% yield). DSC measurement was carried out on the polyimide powder.

In the first scanning, Tm emerged at 389° C. The sample was rapidly quenched and the second scanning was carried out. Tg appeared at 243° C., successively crystallization point (Tc) emerged at 320° C. and Tm finally appeared at 390° C. This sample was rapidly quenched again and the third scanning was carried out by the same procedures. The behavior in the third scanning was quite the same as in the second scanning. That is, the polyimide powder obtained in the Comparative Example was essentially crystalline.

Example 6

To a flask equipped with a stirrer, reflux condenser and nitrogen inlet tube, 19.02 g (0.05 mol) of 4-(3-aminophenoxy)-4'-(3-aminobenzoyl)biphenyl and 119.72 g of N,N-dimethylacetamide were charged and 10.91 g (0.05 mol) of pyromellitic dianhydride was added by portions in a nitrogen atmosphere with caution to prevent temperature rises of the solution. Thereafter the mixture was stirred at the room temperature for 30 hours. Polyamic acid thus obtained had an inherent viscosity of 1.08 dl/g.

A portion of the polyamic acid solution was cast on a glass plate and heated at 100° C., 200° C. and 300° C. for an hour each to obtain a polyimide film.

The polyimide film had Tg of 278° C., tensile strength of 9.27 kg/mm$^2$, elongation of 31% and tensile modulus of 229 kg/cm$^2$.

Examples 7 and 8

Polyimide films were prepared by carrying out the same procedures as described in Example 6 except that acid anhydride components were used as illustrated in Table 2. Table 2 illustrated acid anhydride components, inherent viscosity of polyamic acid, Tg and mechanical properties, together with the results in Example 6.

The polyimide powder thus obtained had an inherent viscosity of 0.59 dl/g, glass transition temperature of 261° C., and 5% weight loss temperature of 559° C.

Flow initiation temperature and melt viscosity were measured by the same procedures as above and results are illustrated in Table 3.

Examples 10~13

Various kinds of polyimide powder were prepared by using diamine components and acid anhydride components as illustrated in Table 3 and carrying out the same procedures as described in Example 9. Table 3 illustrated diamine components, acid anhydride components, inherent viscosity, Tg, 5% weight loss temperature, flow initiation temperature and melt viscosity, together with the results of Example 9.

Examples 14~19

To each 100 parts by weight of various kinds of polyimide powder obtained in the above examples, a silane treated glass fiber CS 3PE-467S (Trade Mark of Nitto Boseki Co.) having a length of 3 mm and a size of 13 μm was added in each amount illustrated in Table 4, mixed with a drum blender (manufactured by Kawata Seisakusho Co.), and melt kneaded at 360°~440° C. with a single screw extruder

TABLE 1

| | Acid anhydride | Yield (%) | η inh (dl/g) | DSC behavior 1st Scan. (°C.) | DSC behavior 2nd Scan. (°C.) | 5% Weight loss temperature (°C.) | Flow initiation temperature (°C.) | 420° C. Melt viscosity (poise) |
|---|---|---|---|---|---|---|---|---|
| Example 2 | PMDA *1 | 95.8 | 0.55 | Tm = 397 | Tg = 270 | 552 | 400 | 12900 |
| Example 4 | BTDA *2 | 96.6 | 0.60 | Tg = 238 | Tg = 243 | 546 | 315 | 8400 |
| Example 5 | ODPA *3 | 96.6 | 0.48 | Tg = 225 | Tg = 230 | 540 | 310 | 7300 |

*1 PMDA: Pyromellitic dianhydride
*2 BTDA: 3,3',4,4'-Benzophenonetetracarboxylic dianhydride
*3 ODPA: 3,3',4,4'-Diphenylethertetracarboxylic dianhydride

TABLE 2

| | Acid anhydride | η inh (dl/g) | Tg (°C.) | Mechanical property Tensile strength (kg/mm$^2$) | Mechanical property Elongation (%) | Mechanical property Tensile modulus (kg/cm$^2$) |
|---|---|---|---|---|---|---|
| Example 6 | PMDA *1 | 1.08 | 278 | 9.27 | 31 | 229 |
| Example 7 | BTDA *2 | 1.15 | 240 | 10.56 | 5 | 297 |
| Example 8 | ODPA *3 | 0.91 | 232 | 9.55 | 11 | 276 |

*1 PMDA: Pyromellitic dianhydride
*2 BTDA: 3,3',4,4'-Benzophenonetetracarboxylic dianhydride
*3 ODPA: 3,3',4,4'-Diphenylethertetracarboxylic dianhydride

Example 9

To a reaction vessel equipped with a stirrer, reflux condenser and nitrogen inlet tube, 13.32 g (0.035 mol) of 4-(3-aminophenoxy)-4'-(3-aminobenzoyl)biphenyl, 3.00 g (0.015 mol) of 4,4'-diaminodiphenyl ether, 10.47 g (0.048 mol) of pyromellitic dianhydride, 0.592 g (0.004 mol) of phthalic anhydride, 0.70 g of γ-picoline and 128.04 g of m-cresol were charged and heated to 150° C. with stirring in a nitrogen atmosphere. Thereafter, the reaction was carried out at 150° C. for 4 hours while distilling out 1.8 ml of water.

After finishing the reaction, the reaction mass was cooled to room temperature and poured into 1 liter of methyl ethyl ketone. Precipitated polyimide was filtered, washed with methyl ethyl ketone, and dried in air at 50° C. for 34 hours and in a nitrogen atmosphere at 230° C. for 4 hours to obtain 30.58 g (97.8% yield) of polyimide powder.

having a bore diameter of 30 mm. The extruded strand was cooled in air and cut into pellets.

Various kinds of pellets thus obtained were injection molded at a cylinder temperature of 360°~420° C. and a mold temperature of 160°~180 ° C. under the injection pressure of 500 kg/cm$^2$ to obtain various test specimens. Physical properties of these specimens were measured in accordance with ASTM on tensile strength (D-638), flexural strength and flexural modulus (D-790), notched Izod impact strength (D-256), heat distortion temperature (D-648) and molding shrinkage (D-955). Results are illustrated in Table 4.

Comparative Examples 2~7

Various kinds of test specimens were prepared by carrying out the same procedures as described in Examples 14~19 except that the glass fiber was used in an amount outside the scope of the invention. Physical properties of these specimens were measured and results are illustrated in Table 4, together with the results of Examples 14–19.

Examples 20–25

To each 100 parts by weight of various kinds of polyimide powder obtained in the above examples, carbon fiber TORECA (Trade Mark of Toray Industries Co.) having a length of 3 mm, average size of 12 μm and an aspect ratio of 250 was added in each amount illustrated in Table 5, mixed with a drum blender, and melt kneaded at 360°–440° C. with a single screw extruder having a bore diameter of 30 mm. The extruded strand was cooled in air and cut into pellets.

Various kinds of pellets thus obtained were injection molded at a cylinder temperature of 360°–420° C. and a mold temperature of 160°–180° C. under the injection pressure of 500 kg/cm² to obtain various test specimens. Physical properties of these specimens were measured. The results are illustrated in Table 5.

Comparative Examples 8–13

Various kinds of test specimens were prepared by carrying out the same procedures as described in Examples 20–25 except that the carbon fiber was used in an amount outside the scope of the invention. Physical properties of these specimens were measured and results are illustrated in Table 5, together with the results of Examples 20–25.

TABLE 3

| | Diamine | | Acid anhydride | | | | 5% Weight | Flow | Melt |
|---|---|---|---|---|---|---|---|---|---|
| Example | Component A (mol) | Component B (mol) | Component A (mol) | Component B (mol) | η inh (dl/g) | Tg (°C.) | loss temperature (°C.) | initiation temperature (°C.) | viscosity (poise) |
| 9 | m-APABB *1 0.035 | 4,4'-ODA *2 0.015 | PMDA *3 0.048 | 0 | 0.59 | 261 | 559 | 325 | 9420 (420° C.) |
| 10 | ↑ | 3,3'-DABP *4 0.015 | ↑ | ↑ | 0.62 | 251 | 543 | 310 | 10300 (↑) |
| 11 | m-APABB 0.05 | 0 | PMDA 0.0336 | BTDA *5 0.0144 | 0.52 | 248 | 548 | 315 | 12400 (↑) |
| 12 | ↑ | ↑ | ↑ | ODPA *6 0.0144 | 0.49 | 244 | 553 | 310 | 8120 (↑) |
| 13 | m-APABB 0.035 | 4,4'-ODA 0.015 | ↑ | BTDA 0.0144 | 0.53 | 239 | 550 | 310 | 9370 (↑) |

*1 m-APABB: 4-(3-Aminopheonoxy)-4'-(3-aminobenzoyl)biphenyl
*2 4,4'-ODA: 4,4'-diaminodiphenylether
*3 PMDA: Pyromellitic dianhydride
*4 3,3'-DABP: 3,3'-diaminobenzophenone
*5 BTDA: 3,3',4,4'-Benzophenonetetracarboxylic dianhydride
*6 ODPA: 3,3',4,4'-Diphenylethertetracarboxylic dianhydride

TABLE 4

| | Resin composition (wt. part) | | | | | | | Izod impact | Heat dis- | |
| | Resin 100 | | | | Tensile | Flexural | Flexural | strength | tortion tem- | Molding |
| Example | Diamine | Acid anhydride | Glass fiber | strength (kg/cm²) | strength (kg/cm²) | modulus (kg/cm²) | (notched) (kg cm/cm²) | perature (18.6 kg/cm²) (°C.) | skrinkage (%) |
|---|---|---|---|---|---|---|---|---|---|
| Example 9 | m-APABB *1 | PMDA *2 | 30 | 1420 | 2110 | 56400 | 13.5 | 260 | 0.1 |
| 14 | | | 60 | 1530 | 2300 | 64100 | 15.0 | 261 | 0.2 |
| ↑ 15 | 11 | ↑ BTDA *3 | 30 | 1490 | 2210 | 57600 | 13.9 | 232 | 0.2 |
| | | | 60 | 1620 | 2390 | 69900 | 15.7 | 234 | 0.2 |
| ↑ 16 | 12 | ↑ ODPA *4 | 30 | 1430 | 2240 | 56100 | 14.2 | 220 | 0.3 |
| | | | 60 | 1600 | 2360 | 68000 | 16.1 | 219 | 0.1 |
| Com. Example 2 | 9 | ↑ PMDA | 3 | 950 | 1530 | 32400 | 6.8 | 253 | 0.8 |
| | | | 120 | (strand-extrusion impossible) | | | | | |
| ↑ 3 | 11 | ↑ BTDA | 3 | 1100 | 1580 | 34900 | 6.2 | 228 | 0.9 |
| | | | 120 | (strand-extrusion impossible) | | | | | |
| ↑ 4 | 12 | ↑ ODPA | 3 | 990 | 1510 | 33500 | 6.7 | 216 | 0.7 |
| | | | 120 | (strand-extrusion impossible) | | | | | |
| Example 17 | 9 | m-APABB +4,4'-ODA *5 | PMDA | 30 | 1490 | 2230 | 59200 | 13.8 | 253 | 0.3 |
| | | | 60 | 1600 | 2410 | 67900 | 14.9 | 255 | 0.2 |
| ↑ 18 | 11 | m-APABB +4,4'-ODA | PMDA + BTDA | 30 | 1510 | 2210 | 60700 | 13.6 | 233 | 0.3 |
| | | | 60 | 1630 | 2440 | 69100 | 14.8 | 233 | 0.3 |
| ↑ 19 | 12 | m-APABB +4,4'-ODA | ↑ | 30 | 1470 | 2160 | 60000 | 14.0 | 217 | 0.2 |
| | | | 60 | 1580 | 2390 | 68500 | 15.5 | 220 | 0.1 |
| Com. Example 5 | 9 | m-APABB +4,4'-ODA | PMDA | 3 | 1030 | 1600 | 33200 | 6.5 | 249 | 0.7 |
| | | | 120 | (strand-extrusion impossible) | | | | | |
| ↑ 6 | 11 | m-APABB | PMDA + BTDA | 3 | 1160 | 1650 | 36200 | 6.6 | 230 | 0.7 |
| | | | 120 | (strand-extrusion impossible) | | | | | |
| ↑ | 12 | m-APABB | ↑ | 3 | 1070 | 1570 | 34000 | 5.9 | 216 | 0.8 |

TABLE 4-continued

| | Resin composition (wt. part) | | | | | | Izod impact | Heat dis- | |
| | Resin 100 | | | Tensile | Flexural | Flexural | strength | tortion tem- | Molding |
| Ex-ample | Diamine | Acid anhydride | Glass fiber | strength ($kg/cm^2$) | strength ($kg/cm^2$) | modulus ($kg/cm^2$) | (notched) (kg cm/$cm^2$) | perature (18.6 $kg/cm^2$) (°C.) | skrinkage (%) |
|---|---|---|---|---|---|---|---|---|---|
| 7 | +4,4'-ODA | | 120 | | | (strand-extrusion impossible) | | | |

*1 m-APABB: 4-(3-Aminophenoxy)-4'-(3-aminobenzoyl)biphenyl
*2 PMDA: Pyromellitic dianhydride
*3 BTDA: 3,3',4,4'-Benzophenonetetracarboxylic dianhydride
*4 ODPA: 3,3',4,4'-Diphenylwthertetracarboxylic dianhydride
*5 4,4'-ODA: 4,4'-diaminodiphenylether

TABLE 5

| | | Resin composition (wt. part) | | | | | | Izod impact | Heat dis- | |
| | | Resin 100 | | | Tensile | Flexural | Flexural | strength | tortion tem- | Molding |
| | Ex-ample | Diamine | Acid anhydride | Carbon fiber | strength ($kg/cm^2$) | strength ($kg/cm^2$) | modulus ($kg/cm^2$) | (notched) (kg cm/$cm^2$) | perature (18.6 $kg/cm^2$) (°C.) | skrinkage (%) |
|---|---|---|---|---|---|---|---|---|---|---|
| Example | 2 | m-APABB *1 | PMDA *2 | 30 | 1390 | 2200 | 59100 | 14.0 | 254 | 0.2 |
| 20 | | | | 60 | 1540 | 2440 | 67100 | 16.2 | 254 | 0.1 |
| ↑ 21 | 4 | ↑ | BTDA *3 | 30 | 1430 | 2180 | 60600 | 13.9 | 229 | 0.1 |
| | | | | 60 | 1570 | 2390 | 70200 | 16.4 | 231 | 0.1 |
| ↑ 22 | 5 | ↑ | ODPA *4 | 30 | 1410 | 2210 | 58400 | 14.4 | 217 | 0.2 |
| | | | | 60 | 1630 | 2430 | 68500 | 16.3 | 219 | 0.3 |
| Com. Example | 2 | ↑ | PMDA | 3 | 960 | 1490 | 31200 | 6.4 | 251 | 0.8 |
| 8 | | | | 120 | | | (strand-extrusion impossible) | | | |
| ↑ 9 | 4 | ↑ | BTDA | 3 | 1000 | 1560 | 33800 | 6.3 | 229 | 0.6 |
| | | | | 120 | | | (strand-extrusion impossible) | | | |
| ↑ 10 | 5 | ↑ | ODPA | 3 | 940 | 1510 | 32000 | 6.7 | 215 | 0.6 |
| | | | | 120 | | | (strand-extrusion impossible) | | | |
| Example 23 | 9 | m-APABB +4,4'-ODA *5 | PMDA | 30 | 1460 | 2290 | 59400 | 14.2 | 250 | 0.2 |
| | | | | 60 | 1590 | 2460 | 67400 | 16.1 | 252 | 0.3 |
| ↑ 24 | 11 | m-APABB | PMDA + BTDA | 30 | 1530 | 2170 | 61100 | 15.1 | 233 | 0.2 |
| | | | | 60 | 1700 | 2370 | 72000 | 17.0 | 234 | 0.2 |
| ↑ 25 | 12 | m-APABB +4,4'-ODA | ↑ | 30 | 1490 | 2240 | 60300 | 14.8 | 217 | 0.2 |
| | | | | 60 | 1660 | 2400 | 69400 | 16.4 | 217 | 0.1 |
| Com. Example | 9 | m-APABB +4,4'-ODA | PMDA | 3 | 1060 | 1640 | 31400 | 6.4 | 246 | 0.6 |
| 11 | | | | 120 | | | (strand-extrusion impossible) | | | |
| ↑ 12 | 11 | m-APABB | PMDA + BTDA | 3 | 1140 | 1600 | 35200 | 6.3 | 232 | 0.6 |
| | | | | 120 | | | (strand-extrusion impossible) | | | |
| ↑ 13 | 12 | m-APABB +4,4'-ODA | ↑ | 3 | 1060 | 1590 | 33700 | 6.0 | 215 | 0.8 |
| | | | | 120 | | | (strand-extrusion impossible) | | | |

*1 m-APABB: 4-(3-Aminophenoxy)-4'-(3-aminobenzoyl)biphenyl
*2 PMDA: Pyromellitic dianhydride
*3 BTDA: 3,3',4,4'-Benzophenonetetracarboxylic dianhydride
*4 ODPA: 3,3',4,4'-Diphenylwthertetracarboxylic dianhydride
*5 4,4'-ODA: 4,4'-diaminodiphenylether

What is claimed is:

1. A amorphous polyimide comprising a requisite structural unit consisting of one or more recurring structural units represented by the formula (1):

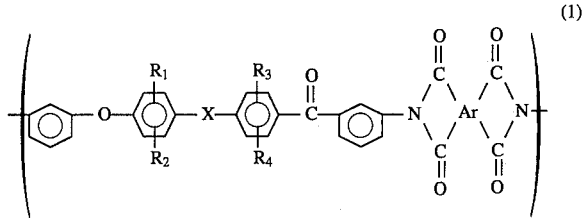

(1)

wherein X is a direct bond, oxygen atom or sulfur atom, and $R_1$, $R_2$, $R_3$ and $R_4$, sre individually a hydrogen atom or methyl, and Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

2. A amorphous polyimide comprising a requisite structural unit consisting of one or more recurring structural units represented by the formula (1):

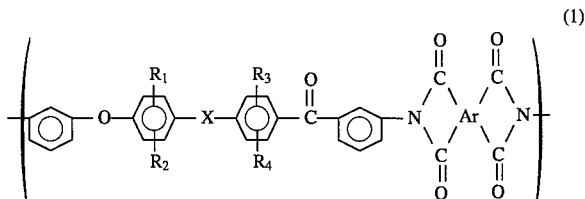

wherein X is a direct bond, oxygen atom or sulfur atom, $R_1$, $R_2$, $R_3$ and $R_4$ are individually a hydrogen atom or methyl, and Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member and having at the polymer chain end thereof an aromatic ring which is essentially unsubstituted or substituted with a radical having no reactivity with amine or dicarboxylic anhydride.

3. The polyimide of claim 2 comprising a requisite structural unit of one or more recurring structural units represented by the formula (1-1):

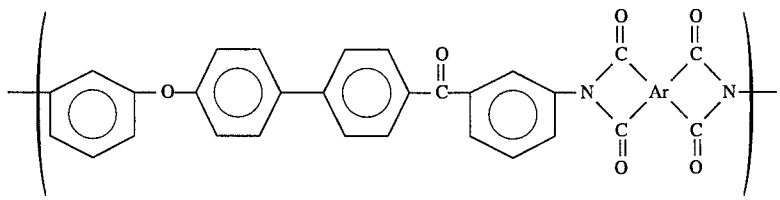

wherein Ar is the same as in the formula (1).

4. A polyimide or a polyimide copolymer comprising a requisite structural unit of 1~100 mol % of recurring structural units represented by the formula (1):

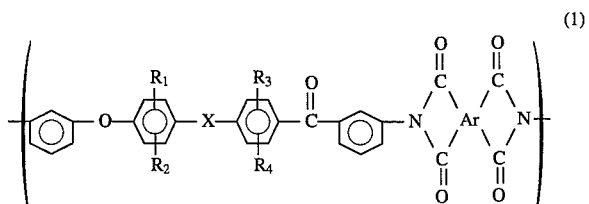

wherein X is a direct bond, oxygen atom or sulfur atom, $R_1$, $R_2$, $R_3$ and $R_4$ are individually a hydrogen atom or methyl, and Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member, and 99~0 mol % of recurring structural units represented by the formula (2):

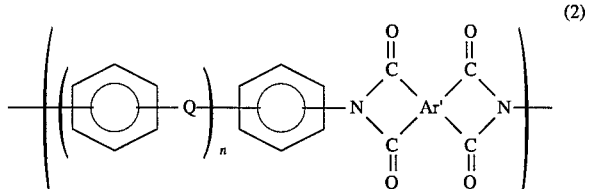

wherein n is an integer of 0 to 6; Q is a direct bond, -O-, -S-, -CO-, -$SO_2$-, -$CH_2$-, -C($CH_3$)$_2$- or -C($CF_3$)$_2$-, and when two or more bonding radicals Q connect aromatic rings to each other, the bonding radicals Q can be the same or different; and Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member; or said polyimide or said polyimide copolymer having at the polymer chain end a radical which is essentially unsubstituted or substituted with a radical having no reactivity with amine or dicarboxylic anhydride.

5. A preparation process of polyimide having a requisite structural unit consisting of one or more recurring structural units represented by the formula (1):

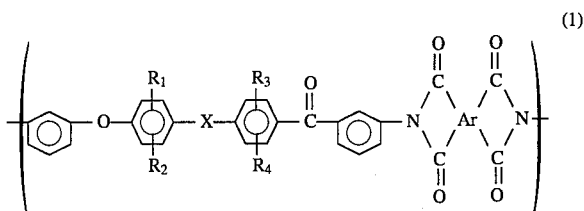

wherein X, $R_1$, $R_2$, $R_3$, $R_4$ and Ar are the same as below, comprising reacting aromatic diamine consisting essentially of one or more aromatic diamino compounds represented by the formula (3):

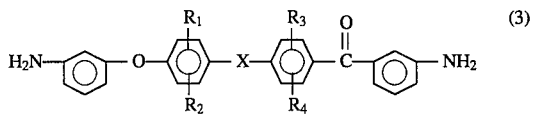

wherein X is a direct bond, oxygen atom or sulfur atom, and $R_1$, $R_2$, $R_3$ and $R_4$ are individually a hydrogen atom or methyl, with tetracarboxylic dianhydride essentially represented by the formula (4):

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member; and thermally or chemically imidizing the resulting polyamic acid.

6. A preparation process of a polyimide having a requisite structural unit consisting of one or more recurring structural units represented by the formula (1):

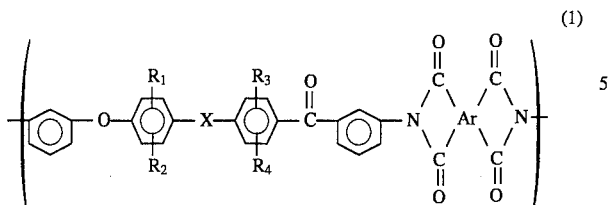

(1)

wherein X is a direct bond, oxygen atom or sulfur atom, $R_1$, $R_2$, $R_3$ and $R_4$ are individually a hydrogen atom or methyl, and Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member, and having at the polymer chain end thereof an aromatic ring which is essentially unsubstituted or substituted with a radical having no reactivity with amine or dicarboxylic anhydride, comprising reacting aromatic diamine consisting essentially of one or more aromatic diamino compounds represented by the formula (3):

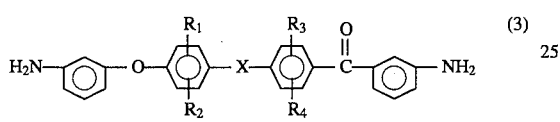

(3)

wherein X, $R_1$, $R_2$, $R_3$ and $R_4$ are the same as above, with tetracarboxylic dianhydride essentially represented by the formula (4):

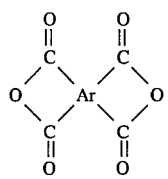

(4)

wherein Ar is the same as above, in the presence of aromatic dicarboxylic anhydride represented by the formula (5):

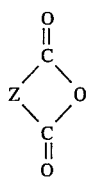

(5)

wherein Z is a divalent radical having 6 to 15 carbon atoms and being selected from the group consisting of a monoaromatic radical, condensed polyaromatic radical and noncondensed polyaromatic radical having aromatic radicals connected to each other with a direct bond or a bridge member, or aromatic monoamine represented by the formula (6):

$Z_1$-$NH_2$ (6)

wherein $Z_1$ is a monovalent radical having 6 to 15 carbon atoms and being selected from the group consisting of a monoaromatic radical, condensed polyaromatic radical and noncondensed polyaromatic radical having aromatic radicals connected to each other with a direct bond or a bridge member; and thermally or chemically imidizing the resulting polyamic acid.

7. A preparation process of polyimide or a polyimide copolymer of claim 5, comprising reacting 1~0.01 parts by mole of aromatic diamine represented by the formula (3):

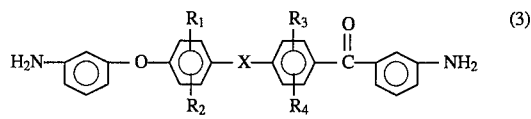

(3)

wherein X, $R_1$, $R_2$, $R_3$ and $R_4$ are the same as above, with 1~0.01 parts by mole of tetracarboxylic dianhydride essentially represented by the formula (4):

(4)

wherein Ar is the same as above, and further reacting 0~0.99 parts by mole of one or more aromatic diamine represented by the formula (9):

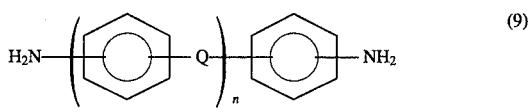

(9)

wherein n is an integer of 0~6, and Q is a direct bond, -O-, -S-, -CO-, -$SO_2$-, -$CH_2$-, -$C(CH_3)_2$- or -$C(CF_3)_2$-, and when two or more bonding radicals Q connect aromatic rings to each other, the bonding radicals Q can be the same or different, with 0~0.99 parts by mole of tetracarboxylic dianhydride represented by the formula (10):

(10)

wherein Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

8. An aromatic diamino compound represented by the formula (3):

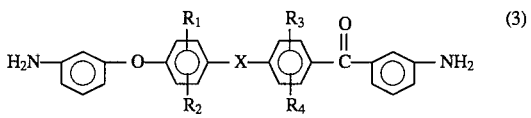

(3)

wherein X is a direct bond, oxygen atom or sulfur atom, $R_1$, $R_2$, $R_3$ and $R_4$ are individually a hydrogen atom or methyl.

9. An aromatic diamino compound of claim 8 represented by the formula (3-1):

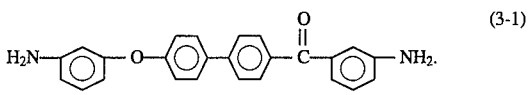

(3-1)

10. A preparation process of an aromatic diamino compound represented by the formula (3):

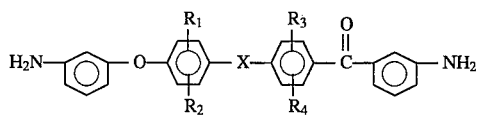

wherein X, $R_1$, $R_2$, $R_3$ and $R_4$ are the same as below, comprising conducting condensation of a phenol compound represented by the formula (7):

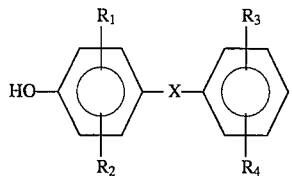

wherein X is a direct bond, oxygen atom or sulfur atom, and $R_1$, $R_2$, $R_3$ and $R_4$ are individually a hydrogen atom or methyl, with m-dinitro benzene in an aprotic polar solvent in the presence of a base, performing a Friedel-Crafts reaction of the resulting aromatic nitro compound represented by the formula (8):

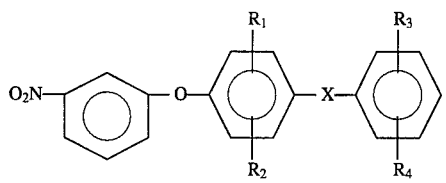

wherein X is a direct bond, oxygen atom or sulfur atom, $R_1$, $R_2$, $R_3$ and $R_4$ are individually a hydrogen atom or methyl, with m-nitrobenzoyl chloride, and reducing the resulting aromatic dinitro compound represented by the formula (9):

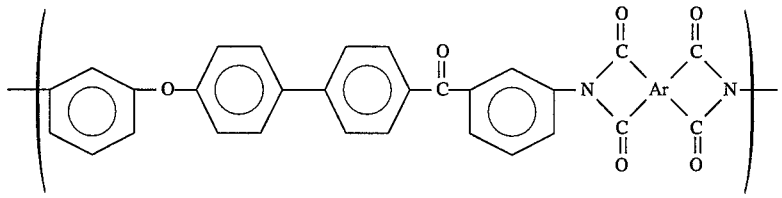

wherein X is a direct bond, oxygen atom or sulfur atom, and $R_1$, $R_2$, $R_3$ and $R_4$ are individually a hydrogen atom or methyl.

11. A polyimide based resin composition comprising 100 parts by weight of polyimide or a polyimide copolymer of claim 4 and 5 to 70 parts by weight of a fibrous reinforcement selected from carbon fiber, glass fiber, aromatic polyamide fiber and potassium titanate fiber.

12. An injection molded article obtained from the polyimide based resin composition of claim 11.

13. A polyimide film comprising the polyimide or the polyimide copolymer of claim 4.

14. The polyimide of claim 1 comprising a requisite structural unit of one or more recurring structural units represented by the formula (1-1):

$$\left( \underset{\text{Ar structure}}{\phantom{XXXXXXXXXXXXXXXXXXXXXXXXXXXXXXXXXXXXX}} \right) \quad (1\text{-}1)$$

wherein Ar is the same as in the formula (1).

15. A polyimide film comprising the polyimide of claim 1.
16. A polyimide film comprising the polyimide of claim 2.

* * * * *